US007136397B2

(12) United States Patent
Sharma (10) Patent No.: US 7,136,397 B2
(45) Date of Patent: Nov. 14, 2006

(54) NETWORK ARCHITECTURE AND SYSTEM FOR DELIVERING BI-DIRECTIONAL XDSL BASED SERVICES

(75) Inventor: Viswa Sharma, San Ramon, CA (US)

(73) Assignee: SLT Logic LLC, Boston, MA (US)

( * ) Notice: Subject to any disclaimer, the term of this patent is extended or adjusted under 35 U.S.C. 154(b) by 688 days.

(21) Appl. No.: 10/223,832

(22) Filed: Aug. 19, 2002

(65) Prior Publication Data

US 2003/0037095 A1 Feb. 20, 2003

Related U.S. Application Data

(60) Provisional application No. 60/313,448, filed on Aug. 20, 2001.

(51) Int. Cl.
*H04J 1/02* (2006.01)
(52) U.S. Cl. .................. 370/493; 370/465; 370/490; 370/352
(58) Field of Classification Search ............... 370/218, 370/420, 465, 535, 466, 490, 493, 494, 495, 370/352; 709/201
See application file for complete search history.

(56) References Cited

U.S. PATENT DOCUMENTS

| | | | | |
|---|---|---|---|---|
| 6,141,330 A | * | 10/2000 | Akers | 370/264 |
| 6,236,664 B1 | * | 5/2001 | Erreygers | 370/492 |
| 6,259,708 B1 | * | 7/2001 | Cheng et al. | 370/493 |
| 6,272,219 B1 | * | 8/2001 | De Bruycker et al. | 379/399.01 |
| 6,400,708 B1 | * | 6/2002 | Bartholomew et al. | 370/352 |
| 6,731,653 B1 | * | 5/2004 | Henderson et al. | 370/490 |
| 6,963,533 B1 | * | 11/2005 | Kukic | 370/228 |

\* cited by examiner

*Primary Examiner*—Ricky Q. Ngo
*Assistant Examiner*—Nguyen Ngo
(74) *Attorney, Agent, or Firm*—Patterson, Thuente, Skaar & Christensen, P.A.

(57) ABSTRACT

A simple network comprises of: xDSL service equipment located at a distribution center coupled to an Aggregator Separator (AGSEP) System located at a DC; AGSEP system at the DC is coupled, using a high-speed link, to another AGSEP system located at a remote site, which is coupled to subscriber equipment using drop cables. The AGSEP systems aggregate the xDSL signals originating at either DC xDSL equipment or subscriber equipment, are carried over the high-speed link. The AGSEP systems and separate the aggregated signals at either end to distribute the separated signal to the respective equipment.

14 Claims, 11 Drawing Sheets

FIG. 10 Processor Module

FIG. 11 Optical Converter

NETWORK ARCHITECTURE AND SYSTEM FOR DELIVERING BI-DIRECTIONAL XDSL BASED SERVICES

CROSS-REFERENCES TO RELATED APPLICATIONS

This patent application claims the benefit of Provisional Application 60/313,448, filed Aug. 20, 2001, for "Network Architecture and System for Delivering Bi-Directional xDSL Based Services", which is incorporated herein by reference for all purposes.

BACKGROUND OF THE INVENTION

The present invention relates to broadband networks and systems, and more particularly to Digital Subscriber Line (DSL) technology.

The demand for broadband communication at higher bandwidth, to accommodate multimedia information, is growing. Telecommunication and Cable networks are providing these services to subscribers, in increasing numbers.

Telecommunication networks and Cable networks use a central Distribution Center [DC] such as a Central Office in telecommunications or a Head end in cable networks, to house the network equipment to serve a community of subscribers. The equipment in DCs are interconnected to each other using a backbone or core network, form a larger network. Typically, the subscribers are located with in five-mile radius of the DC. The equipment located at the DC and the equipment located at subscriber locations are connected using drop cables. Typically, the drop cables in a telecommunication network are twisted pair copper wires and Coaxial Cables are used in the Cable networks.

The Digital Subscriber Loop [DSL] technology is widely used in the Telecommunication networks for broadband services. There are a number of variations of DSL technologies such as high bit-rate digital subscriber line (HDSL), Symmetric or Single pair Digital Subscriber Line (SDSL, symmetric high bit-rate digital subscriber line (SHDSL), asymmetric digital subscriber line (ADSL), very-high-bit-rate digital subscriber line (VDSL)and rate adoptive digital subscriber line (RADSL). The term "xDSL" is used in art to include all of the variations of DSL Technology. Each of this xDSL technology is suited to a different application with trade-off made between transmission distance and bandwidth. The broadband service data rate ranges from 300 Kilobits per second [Kbps] to 52 Megabits per second [Mbps]. The trade off and capability of each variation of xDSL technology is well known in the art.

The transmission from a Distribution center (DC) to a subscriber is termed "downstream" and the transmission from a Subscriber to the DC is termed "upstream". The system is asymmetrical when the upstream and downstream bandwidths differ. The system is symmetrical when the upstream and downstream bandwidths are equal. Both symmetrical and asymmetrical xDSL services are in use. The upstream and downstream services are carried over either a single twisted pair copper wire, termed duplex transmission, as is ADSL, VDSL and are carried over multiple pairs of twisted pair wires as in HDSL, termed dual-duplex transmission.

The DSL technology uses a variety of modulation techniques, such as, Two binary one quaternary (2B1Q), Carrierless Amplitude and Phase modulation (CAP), Discrete Multitone (DMT) and Quadrature Amplitude Modulation (QAM). These modulation techniques are standardized by the international standards bodies and are well know in the art.

Narrowband signals such as voice signals are frequency multiplexed with the broadband signals. These multiplexing techniques are well known in the art.

Thus, the DSL technology allows data, voice, and video to be transmitted simultaneously over standard twisted-pair copper wiring at multi-megabit rates, to form a complete converged communication network.

In a typical DSL based network, the Digital Subscriber Access Concentrator (DSALM) and switching equipment is located at a DC. The subscriber equipment such as a DSL modem is coupled to the DSLAM by twisted pair copper wires.

The direct wire service limits the bandwidth of the chosen xDSL service. Typically, less than 6 Mbit upstream and 760 kilobits upstream data can be transmitted up to a 18 Kilo Feet. This distance reduces to 1,500 ft to services over 25 megabits. These xDSL technology dependent limitations are well known in the art. The Other factors such as line impairment, bundling of wires in a binder group, Load Coils, stubs either makes it impossible or adds further limitation to the distances of the services.

Several techniques such as improved xDSL signals, mid-span repeaters and loop extenders are being tried in the art.

Digital Loop Carrier (DLC) have been in use to overcome the high cost of adding new copper wires either to overcome the impairments or to meet growing service demands of telecommunication services. These DLCs are typically used to provide Voice lines from an Out Side Plant (OSP). A high capacity link carrying multiple voice lines such as T Carrier system or OC3 line is used from the DC to a DLC located at remote site. At the DLC Plain Old Telephone Services (POTS), service is derived and distributed to subscribers. However, these high-speed links are not able to carry xDSL signals, to offer combined broadband services.

To serve these subscribers with broadband services, DSLAM or Remote Access Modules (RAM) are being used. These remote systems are either located with in the DLC cabinet or housed next to the DLC in another Outside Plant equipment cabinet. The xDSL signal generated at the remote systems is additionally frequency division multiplexed with Voice at the DLC and distributed to subscribers.

Newer DLC equipment that can house the DSLAM line cards with in the DLC cabinets are also in use.

For these solutions, the xDSL Processing Electronics needs to be at the remote site requiring: Out Side Plant environment hardened equipment, Space, Network Management System, Power and Maintenance.

A subscriber can be served by high bandwidth transmission capable media such as Fiber from DC all the way to the subscriber location. However, it is extremely costly to connect every user with high bandwidth media.

Commercially practical alternatives using, combination of fiber cables feeding neighborhood Optical Network Unit (ONU) and subscriber connected by existing or new copper from the ONU, are being discussed in the art. This topology is called Fiber to the Neighborhood (FTTN). This topology also encompasses Fiber to the Curb (FTTC) with short drops of copper to individual subscriber or Fiber to the Basement (FTTB), serving tall buildings with vertical copper drops to individual subscribers.

It would be desirable for FTTN networks to make use of the DSLAM equipment and or include the present DLC served subscriber.

It would be desirable for FTTN networks to reduce the processing electronics like remote DSLAM or RAM, Line cards or ONU, which add electrical power, space, service provisioning and maintenance complexity.

It would be desirable that such a network to deliver variable bandwidth connections and multiple types of service to the subscribers, to deliver the voice, Data and Video services, using twisted pair copper, multiple twisted pair copper, coaxial cable, free air or fiber media.

BRIEF SUMMARY OF THE INVENTION

The present invention is an improved and cost effective broadband network for providing bi-directional Voice, Data, Video services from a Distribution Center (DC) to residential or business subscribers, using xDSL technology.

A simple network comprises an Aggregator Separator (AGSEP) System located at a DC, coupled using a high-speed link to an AGSEP system located at a remote site, which is coupled to subscriber equipment using drop cables.

The xDSL traffic, provisioned and processed per subscriber at the DC xDSL equipment and destined to one or a plurality of subscribers in analog format, in a region of interest are connected using preferred drop cables to the AGSEP system. AT the AGSEP system, these xDSL signals are aggregated to form an outward radio frequency stream. The aggregated outward radio frequency stream is carried over a high-speed link (Coaxial cable; Fiber; Free Air) to a Remote Terminal (RT), situated at a convenient location (CL), such as Controlled Environment Vault (CEV), Out Side Plant (OSP) or a building. At the RT, the radio frequency signal stream as separated as provisioned and brought back to their analog format, to be similar to that at the originating DC xDSL equipment, then is routed to the subscriber locations, using the preferred drop cable.

The subscriber xDSL traffic, destined to one or more DC equipments, originating at the subscriber location, is brought to the RT, in analog format, using the preferred drop cable. At the RT, the upstream signals from a plurality of subscriber drop cables are aggregated to from an inward radio frequency stream. The inward radio frequency stream is carried over a high-speed link, in a similar fashion to that of the DC AGSEP system. At the DC, the upstream signals are separated from the radio frequency stream and brought back to their analog format, to be similar to that at the subscriber location, are routed to, the destined and provisioned DC equipment, in a fashion similar to that of RT using the preferred drop cable.

In one of the embodiments of the invention, the CL could be an existing DLC location. In this case, the POTS services are coupled with xDSL signals, using the multiplexing methods known in the art.

In one embodiment, The POTS services is derived, using xDSL technology, at the RT and then the POTS services are coupled at the RT, using the multiplexing methods known in the art.

The specific embodiments of the present invention disclosed below provide many benefits to service providers and users In one embodiment, The POTS services is derived, using xDSL technology, at the RT and then the POTS services are coupled at the RT, using the multiplexing methods known in the art.

The invention extends the reach of multiple types of xDSL service processing systems located at the DC to the remote business and residential subscribers.

The invention alleviates the problems of space, electrical Power, service and maintenance, encountered in providing DSL service to business and residential subscribers, who are served by a Digital Loop Carriers (DLC) with remote DSLAM; RAM and Next Generation DLC (NGDLC) or service aggregation systems with in the building.

It enables the service providers to offer enhanced services like variable bi-directional bandwidth, bandwidth on demand, multiple types of xDSL services.

It enables the service providers to offer dissimilar xDSL technologies like HDSL, ADSL, and VDSL from a DC to a remote location and distributed to the same subscribers with these diverge services or different subscribers with different services with in the same community of interest.

These and other benefits will become apparent to those skilled in the art upon reading the specific embodiments described.

DETAILED DESCRIPTION OF THE INVENTION

The present invention is directed to a broadband network architecture that allows a group of users to share communication infrastructure. The figures and description provided herein are merely illustrations and should not limit the scope of the present invention. One of ordinary skill in the art would recognize other variations, modifications, and alternatives.

Figure 1:
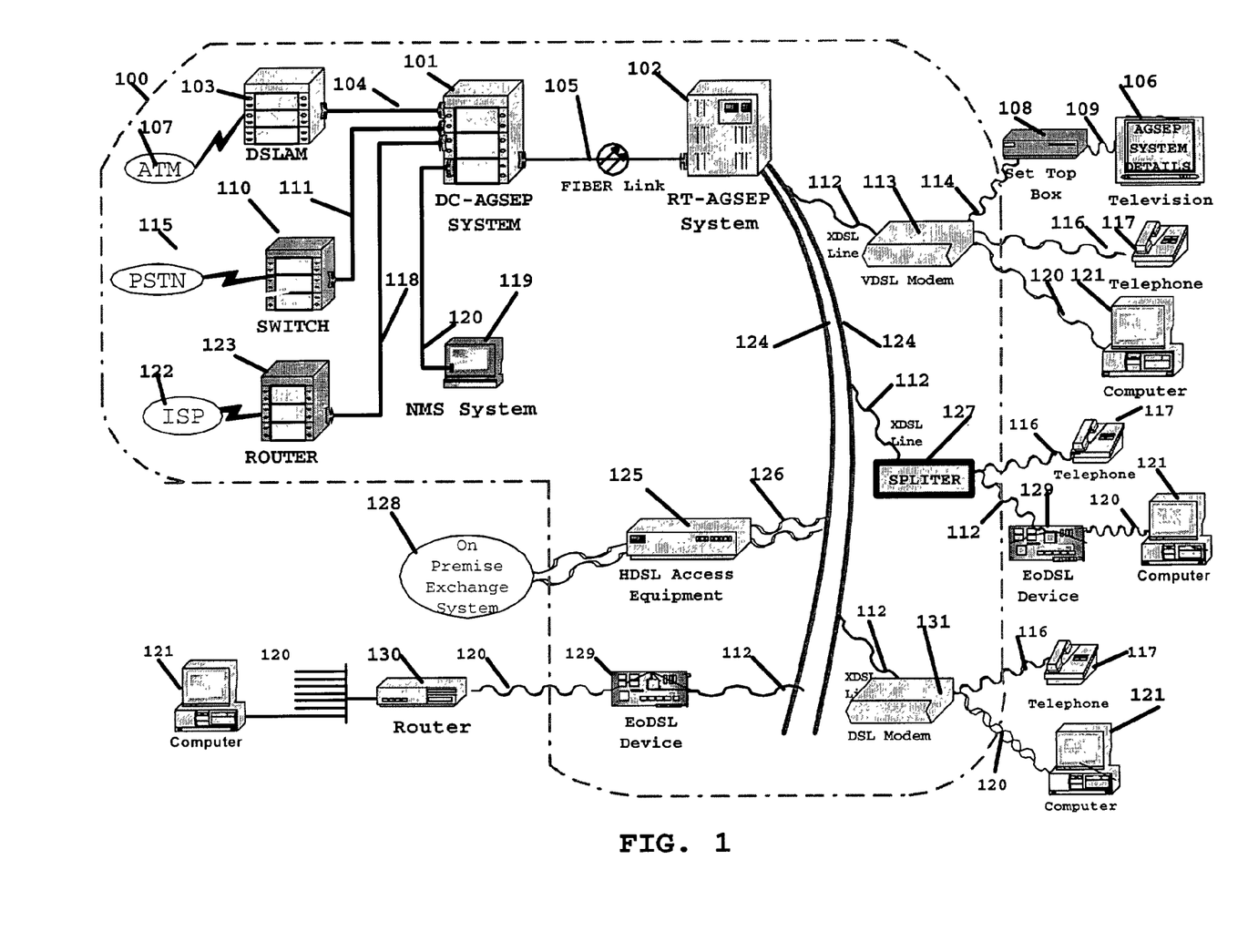
FIG. 1 is a schematic diagram of network architecture incorporating a VoDSL based Digital Loop Carrier and providing xDSL services according to one embodiment of the present invention.
Figure 2:
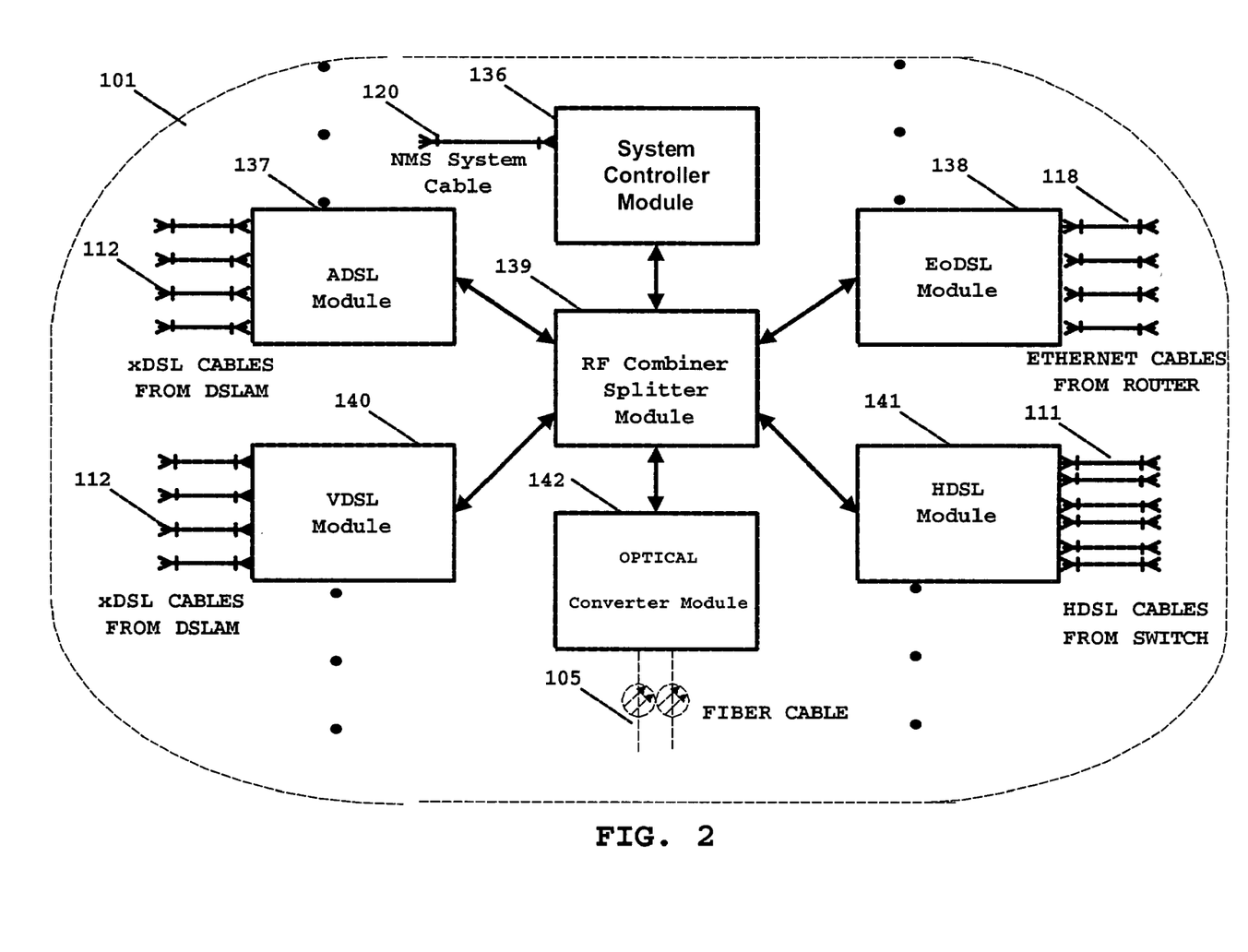
FIG. 2 is a schematic diagram of network architecture, providing xDSL services using an existing DLC, according to another embodiment of the present invention.
Figure 3:
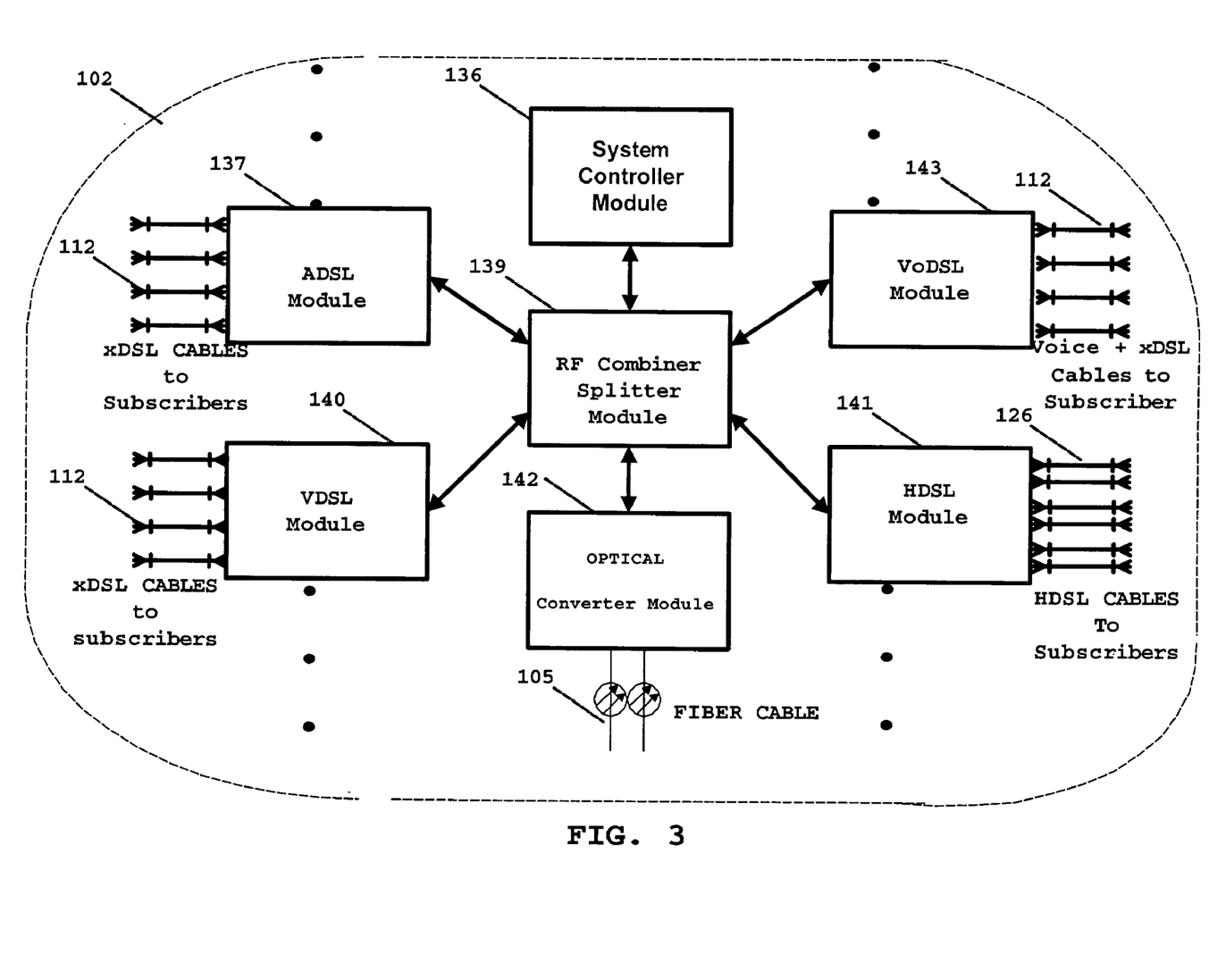
FIG. 3 is a schematic diagram of showing the types of equipments that are used for xDSL services shown in FIG. 1 and FIG. 2, at the DC, according to one embodiment of the present invention.
Figure 4:
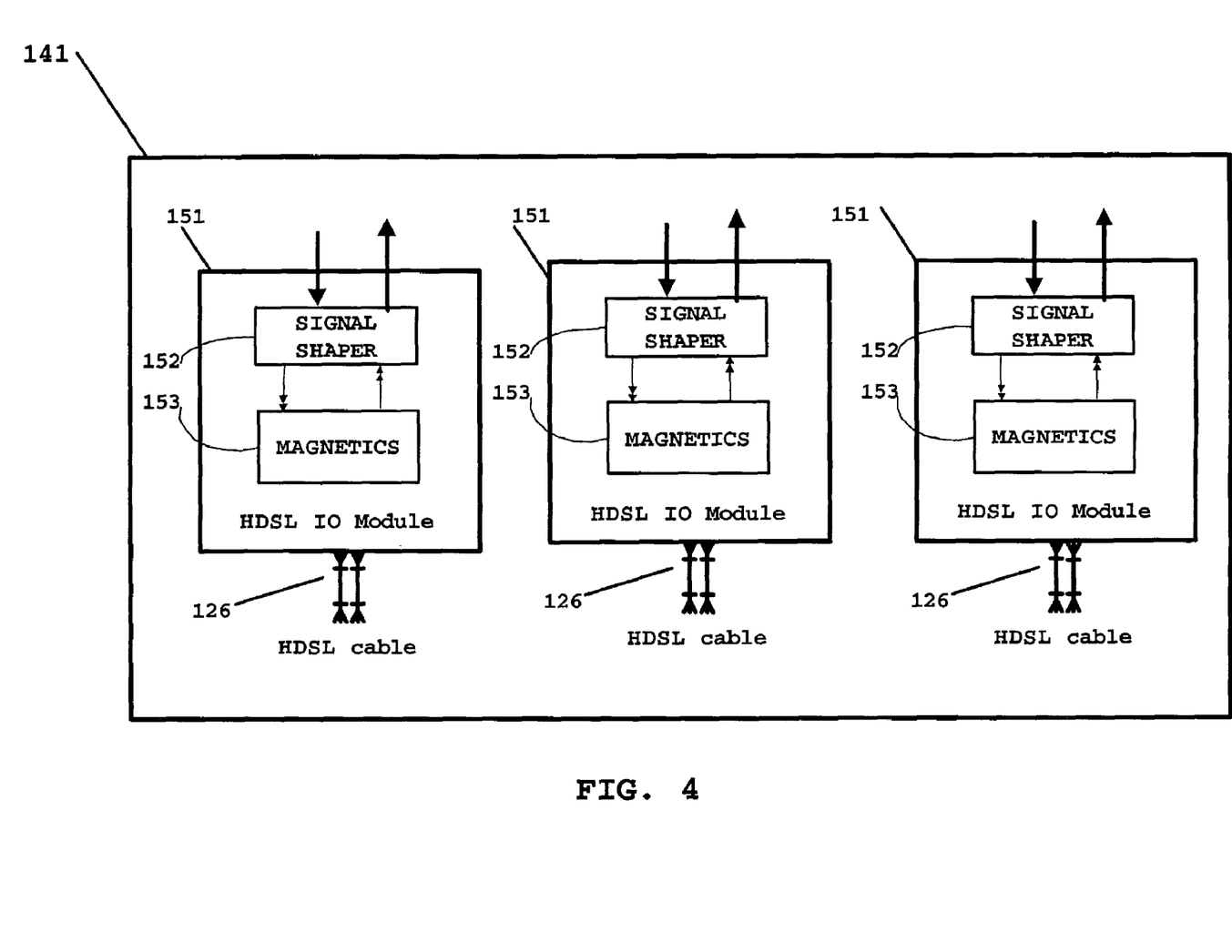
FIG. 4 is a schematic diagram of showing the types of equipments that are used for xDSL services shown in FIG. 1 and FIG. 2, at the subscriber location, according to one embodiment of the present invention.
Figure 5:
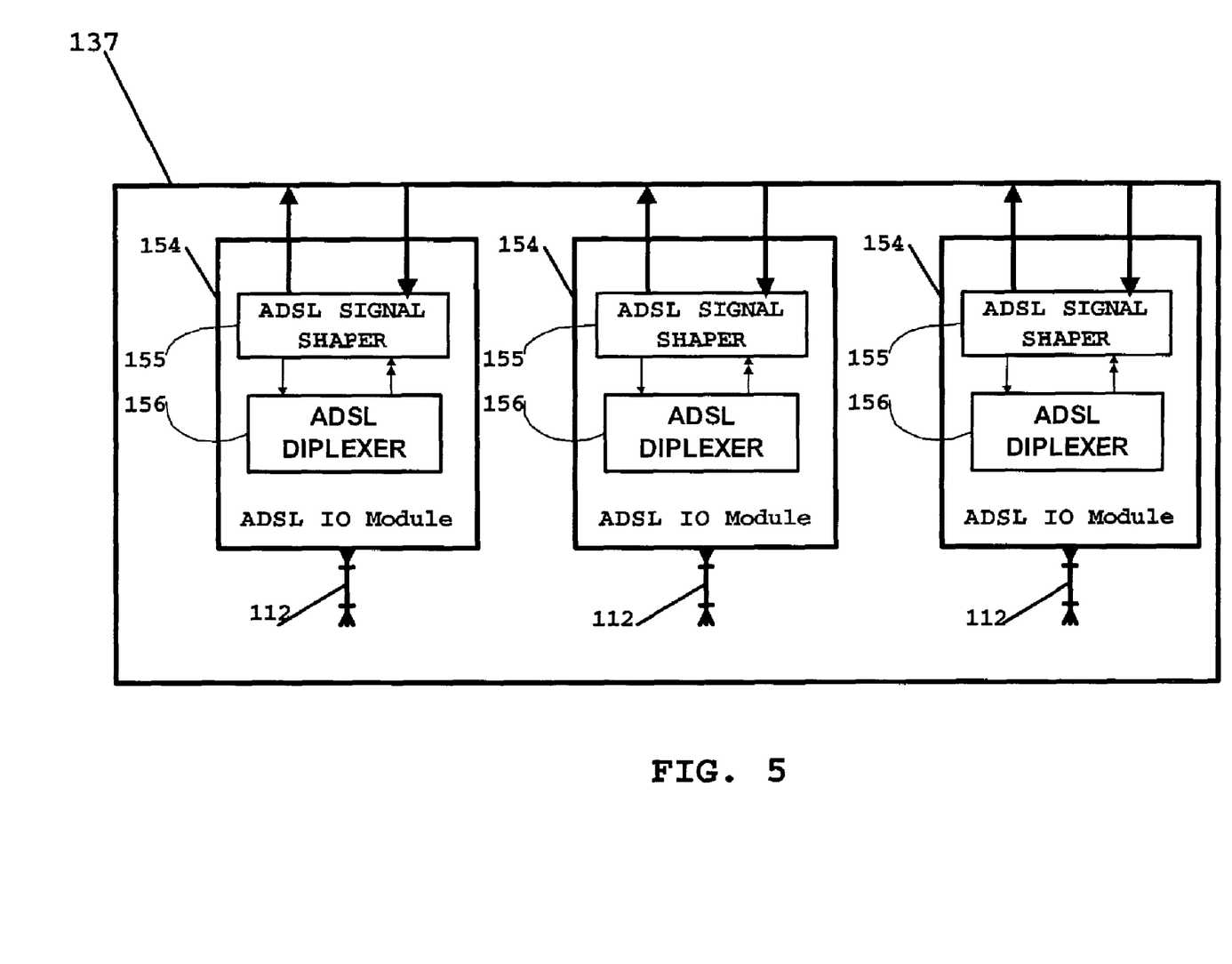
FIG. 5 is a schematic diagram of showing the types of equipments that are used for xDSL services shown in FIG. 1 and FIG. 2, at the subscriber location, according to one embodiment of the present invention.
Figure 6:
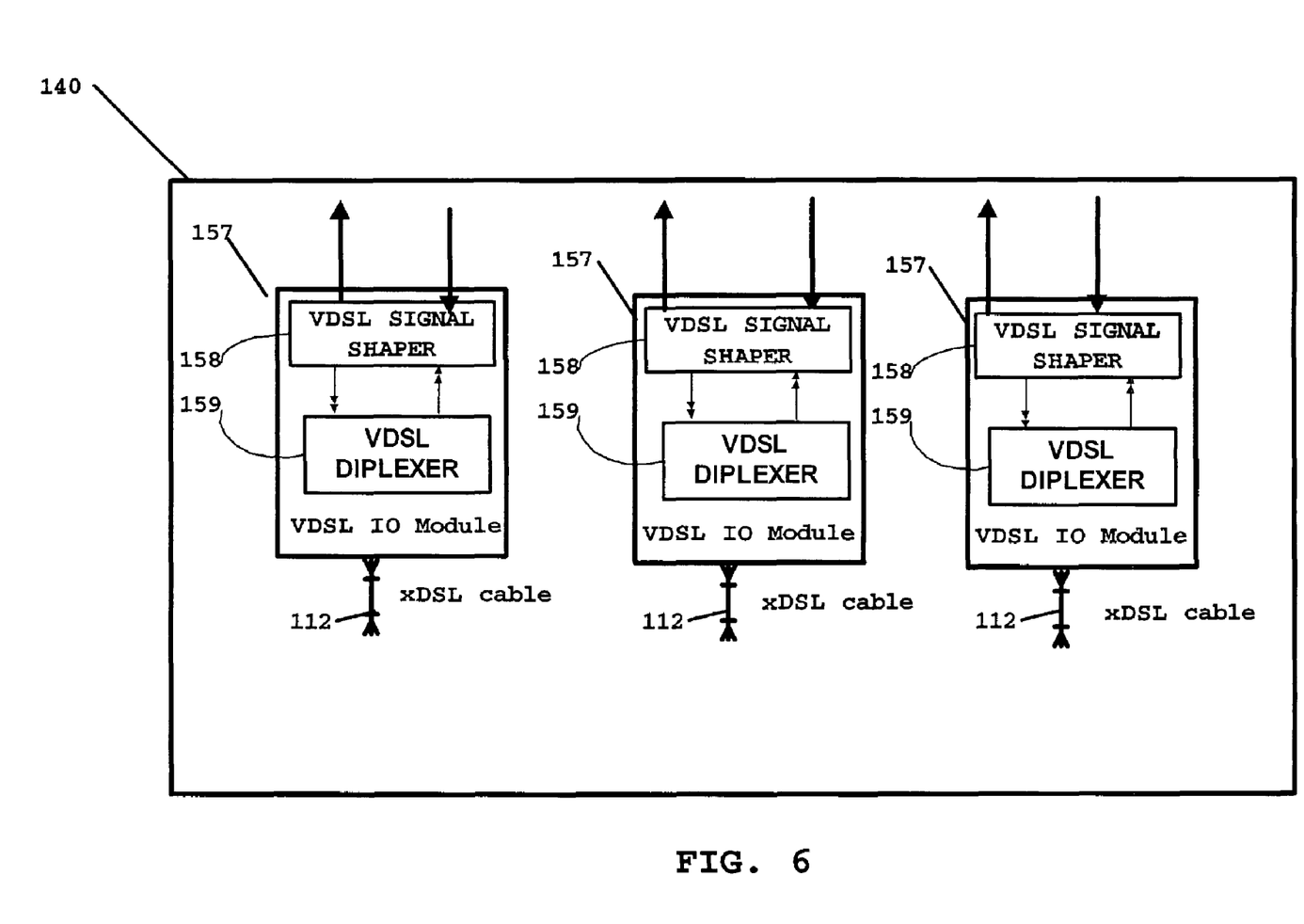
FIG. 6 is a schematic diagram of xDSL terminations used in FIG. 3, FIG. 4 and FIG. 5 according to one embodiment of the present invention.
Figure 7:
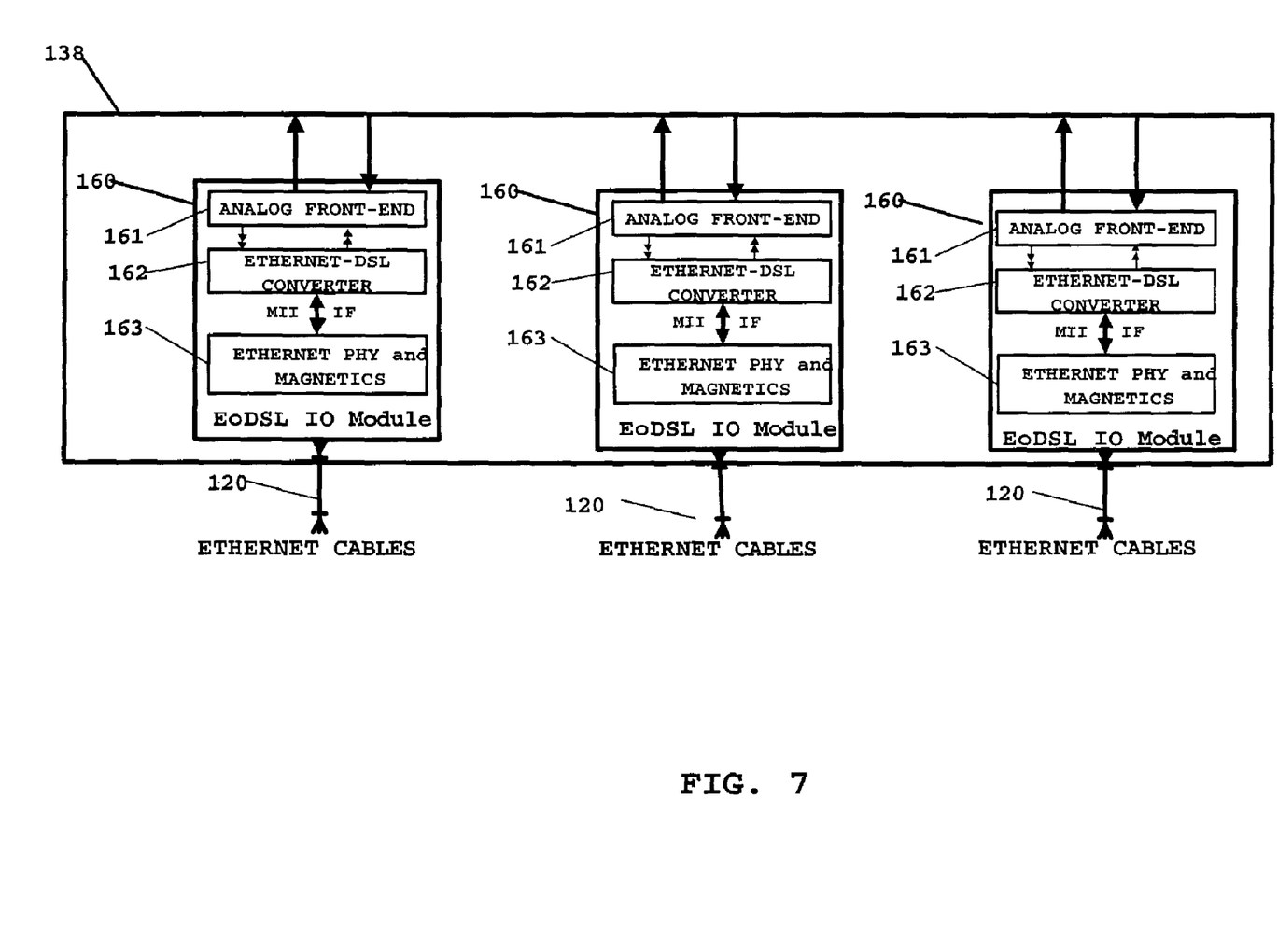
FIG. 7 is a schematic diagram of an aggregator device for network architecture shown in FIG. 1 and FIG. 2 according to one embodiment of the present invention.
Figure 8:
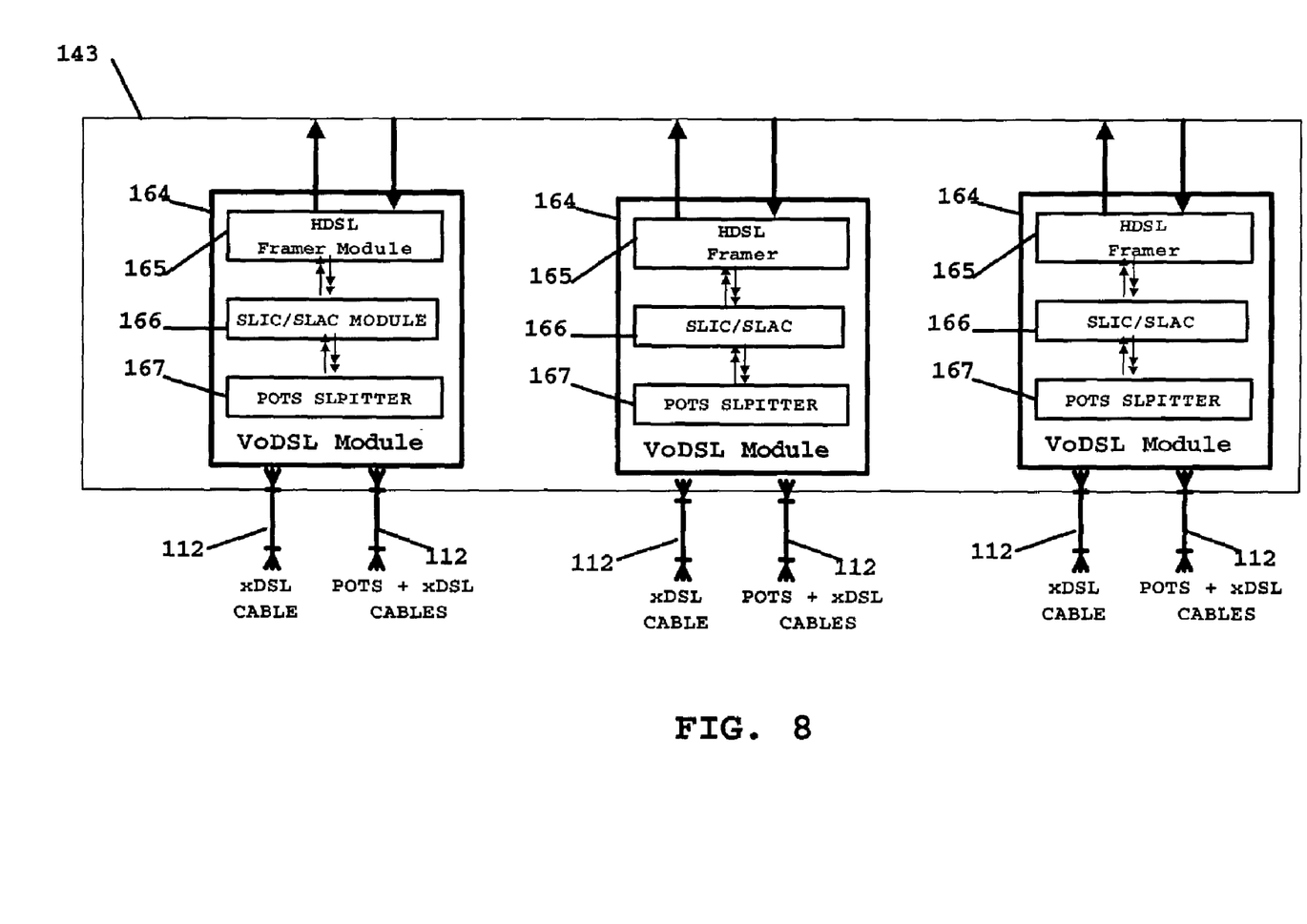
FIG. 8 is a schematic diagram of a separator device for network architecture shown in FIG. 1 and FIG. 2 according to one embodiment of the present invention.
Figure 9:
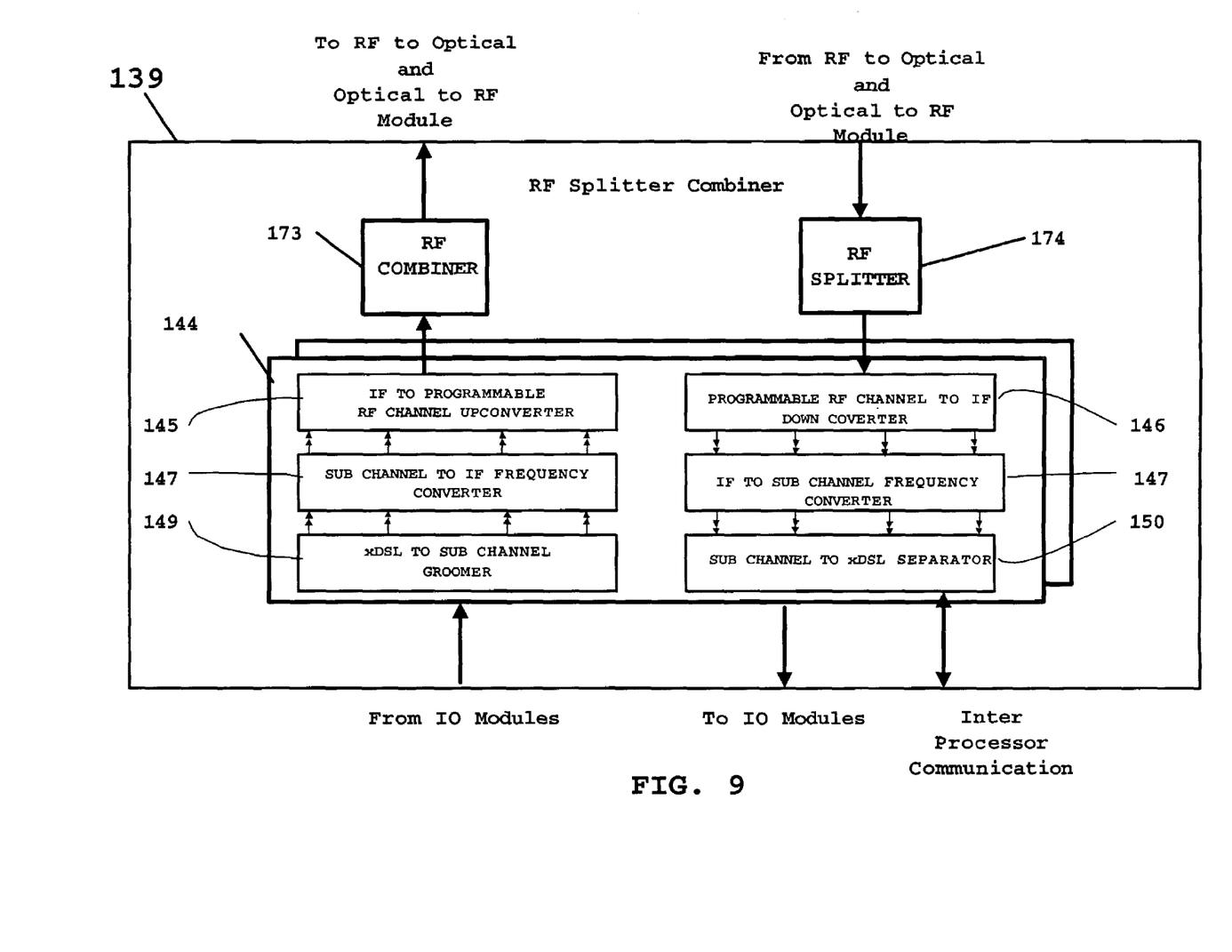
FIG. 9 is a more detailed diagram of an rf combiner splitter module shown in FIG. 2 according to an embodiment of the present invention.
Figure 10:
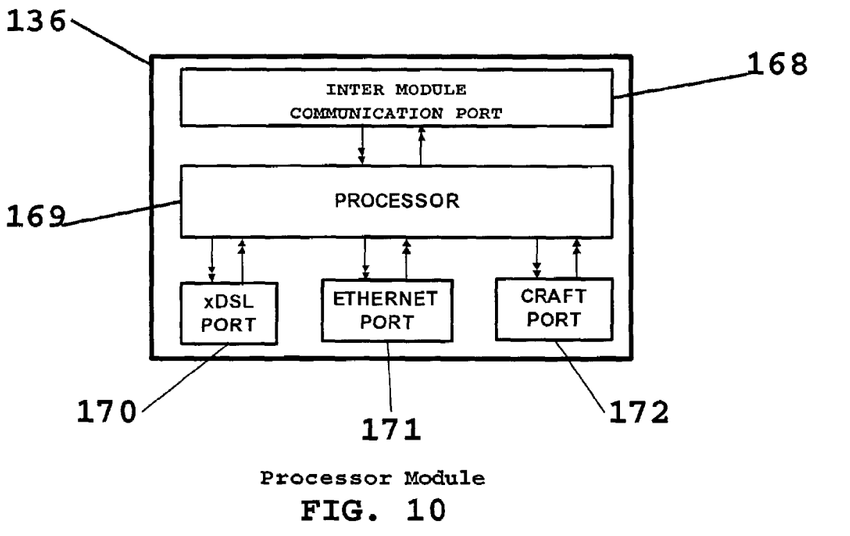
FIG. 10 is a more detailed diagram of a processor module shown in FIG. 2 according to an embodiment of the present invention.
Figure 11:
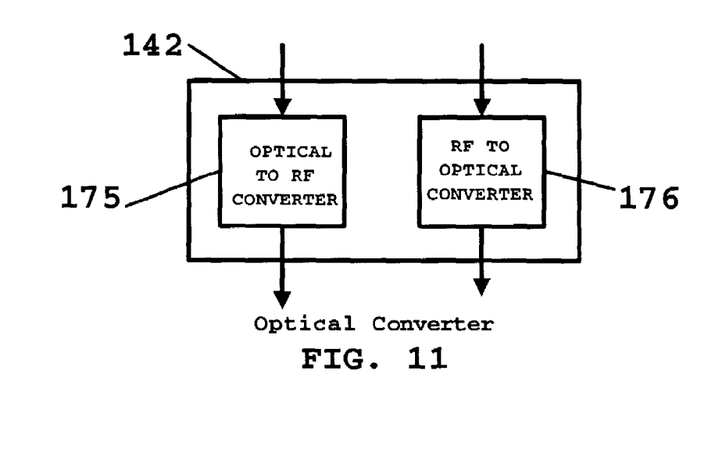
FIG. 11 is a more detailed diagram of an optical converter module shown in FIG. 2 according to an embodiment of the present invention.
Figure 12:
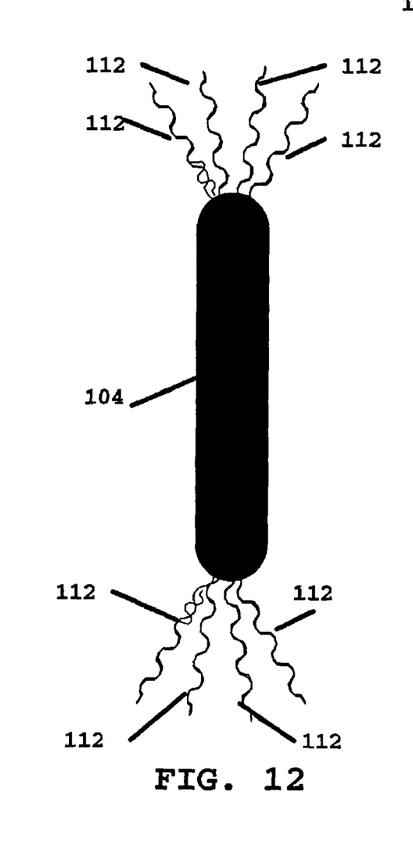
FIGS. 12–15 are detailed diagrams of twisted pair wiring diagrams shown in FIG. 3 according to an embodiment of the present invention.
Figures 13, 14, 15:
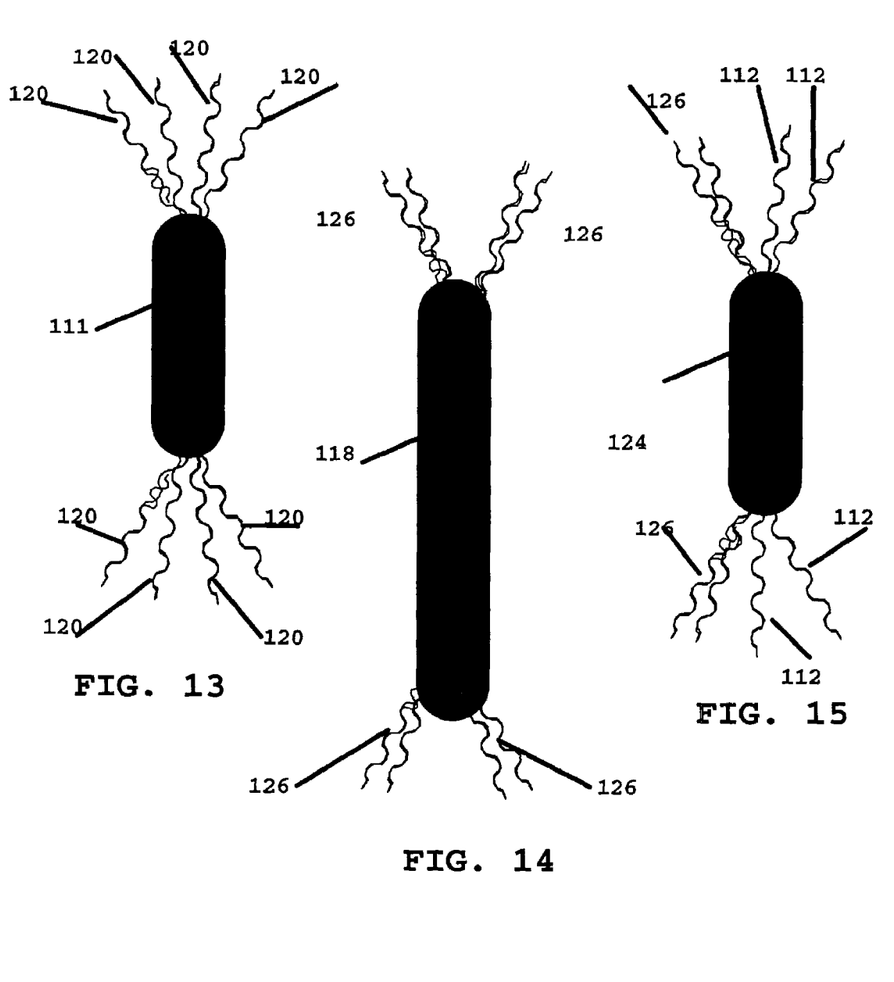

The schematic diagram of network of present invention, which derives POTS at the RT, is shown in FIG. 1. The xDSL services are provided by one or multiple types of DC equipment; DSLAM; Ethernet Switch and or Router; VoDSL Gateway; Digital Switches as shown in FIG. 3. These are collectively called DC Equipment, shown in FIG. 1. The Aggregator and Separator (AGSEP) System is located at the DC is referred to as DC-AGSEP System in FIG. 1. The drop cables from the DC equipment are connected to the DC Input Output Module (DCIOM) of the DC-AGSEP system. Another AGSEP system is located at CL and is referred to as RT-AGSEP System in FIG. 1. The DC-AGSEP and RT-DGSEP systems are connected using high-speed link. One or more Subscriber equipment shown in FIG. 4 and FIG. 5, are connected the RT-AGSEP system using drop cables.

At the DCIOM of the DC-AGSEP system, the xDSL line from the DC xDSL Equipment is separated to receive and transmit signal frequencies as provisioned, if the line is uses a single drop cable for transmitting and receiving. If the line uses a separate transmit and receive drop cables, the transmit drop cable is used for transmit signal. The transmit signal is fed to the DC Signal Grooming Module (DCSGM). The DCSGM combines the analog transmit signals from one or more inputs, to a sub channel of a programmable bandwidth. The number of transmit signals to be groomed are provisioned by the DC-AGSEP system's craft interface. In the preferred embodiment of the invention using, a six-mega hertz bandwidth is used for sub channel. The choice of the sub channel in the preferred embodiment is to harness the components used in cable television networks. However, other channel bandwidth is used as needed to accommodate the efficient multiplexing of signals. The sub channel is up converted to an intermediate frequency (IF) by the DCIF Converter Module. The converted IF frequency signal is fed to the DC combiner module (DCCM). The DCCM receives the IF signals from a plurality of IF converters. The DCCM is provisioned by the DC-AGSEP craft interface to convert the specific IF input to a RF range. The IF input is up converted to the provisioned RF frequency. The RF combiner module combines the RF frequency inputs to form an outward RF stream. The DCCM is capable of multiplexing xDSL signal using different modulation techniques, such as 2B1Q, CAP, DMT and QAM into a sub channel. The DCCM is capable of using multiple sub channels for a single xDSL input to accommodate higher bandwidth xDSL channel.

The RF stream can be carried over Coaxial cable, Fiber, and free air in specific embodiments of the invention. The RF stream of the RF Combiner module is fed to the RF to Optic converter unit, in the preferred embodiment of the present invention. The RF to Optic converter module modulates the RF stream, using linear modulation technique. A 1540 nm laser diode is used. A pair of single mode fiber is used to connect the DC-AGSEP and RT-AGSEP systems one for Transmitting signals and one for receiving signals.

At the RT, Optical to RF converter module converts the Optical signal to electrical RF stream. The RF stream in fed to IF down converting module. The down converted signals are fed to RT Signal Separator module (RTSSM). The RT-SSM separates the down converted signal to sub channels of the XDSL streams. The RTSSM is capable of de-multiplexing xDSL signal using different modulation techniques, such as 2B1Q, CAP, DMT and QAM from a sub channel. The entire sub channel may contain a single xDSL component. A set of sub channels may contain a single xDSL component.

A fixed group of sub channels is dedicated to communication between DC-AGSEP, RT-AGSEP and optionally to and from Subscriber equipment. This channel, referred to as the Management Channel, carries the provisioning information, status information, statistical information and other management information A set of sub channels is dedicated for Voice traffic. The provisioning information for Voice channel is used to derive Voice services at the RT. In the preferred embodiment, HDSL is used for voice services. The RT SSM separates the HDSL stream form the sub channel and feed it to the Voice module. The Voice module provides POTS services. The functionality of Voice module is well known in the art and it is not described here.

Using the provisioning data the RTSSM separates the sub channels to individual component xDSL signals. The component xDSL signals are then fed to Input Output Module (RTIOM). If the subscriber line is provisioned to get the transmit signal on a separate drop cable, this component signal is sent to the subscriber transmit drop cable. If the subscriber line is provisioned to use the same drop cable for receive and transmit signals, the component xDSL signal is coupled on to the subscriber's line using diplexer.

If the subscriber line is provisioned for the POTS service, the POTS lines from the Voice module is frequency multiplexed with the subscriber xDSL signal. The subscriber xDSL signal is sent to the subscriber equipment using drop cables, connected to RTIOM. In the preferred embodiment, a separate drop cable is used for each type of xDSL and a sub channel per drop cable. However, it is obvious multiple xDSL channels or multiple sub channels can be carried over a single drop cable.

At the RT Input Output Module (RTIOM) of the RT-AGSEP system, the xDSL line from the Subscriber Equipment is separated to receive and transmit signal frequencies as provisioned, if the line is uses a single drop cable for transmitting and receiving. If the line uses a separate transmit and receive drop cables, the transmit drop cable is used for transmit signal.

If the subscriber line is provisioned for the POTS service, the POTS signals from the subscriber line is decoupled and the POTS signal is fed to the Voice module.

The transmit signal is fed to the RT Signal Grooming Module (RTSGM) which is similar to DCSGM. The RTSGM combines the analog transmit signals from one or more inputs, to a sub channel of a programmable bandwidth. The number of transmit signals to be groomed are provisioned by the DC-AGSEP system using the Management Channel. The sub channel is up converted to an intermediate frequency (IF) by the RT IF Converter Module. The converted IF frequency signal is fed to the RT combiner module. The RT combiner module receives the RT IF signals from a plurality of IF converters. The RT combiner module is provisioned, using the Communication Channel, to convert the specific IF input to a RF range. The RT IF input is up converted to the provisioned RF frequency. The RT RF combiner module combines the RF frequency inputs to form RT RF stream.

The RT RF stream of the RT RF Combiner module is fed to the RT RF to Optic converter unit. The RF to Optic converter module modulates the RF stream, using linear modulation technique. A 1510 nm laser diode is used. A pair of single mode fibers is used to connect the DC-AGSEP and RT-AGSEP systems.

At the DC-AGSEP system, DC Optical to RF converter module converts the received Optical signal from RT, to electrical RF stream. The RF stream in fed to DC IF down converting module. The down converted signals are fed to DC-SSM. The DCSSM separates the down converted signal to sub channels of the XDSL streams.

Using the provisioning data the DCSSM separates the sub channels to individual component xDSL signals. The component xDSL signals are then fed to DCIOM. If the DC line is provisioned to get the transmit signal on a separate drop cable, this component signal is sent to the DC equipment transmit drop cable. If the subscriber line is provisioned to use the same drop cable for receive and transmit signals, the component xDSL signal is coupled on to the DC equipment line using diplexer.

What is claimed is:

1. A network system for delivering bi-directional digital subscriber loop (xDSL) services to a plurality of subscribers connected to a Distribution Center by an existing Plain Old Telephone System (POTS) twisted wire pair infrastructure, the network system comprising:

a first aggregator separator system provided proximate the Distribution Center and operably coupled to a plurality of broadband service systems via the Distribution Center that aggregates xDSL services from the plurality of broadband services and destined for the plurality of subscribers as an outward radio frequency stream and that separates xDSL services received from the plurality of subscribers as an inward radio frequency stream into separated xDSL services which are delivered to the plurality of broadband services; and a second aggregator separator system provided at a location remote from the Distribution Center and remote from the plurality of subscribers and operably coupled to each of the plurality of subscribers by a twisted wire pair drop line in the existing POTS twisted wire pair infrastructure that aggregates xDSL services from the plurality of subscribers and destined for the Distribution Center as the inward radio frequency stream and that separates xDSL services received from the plurality of broadband services as the outward radio frequency stream into separated xDSL services, each of which is delivered to one of the plurality of subscribers by the corresponding twisted wire pair drop line in the existing POTS twisted wire pair infrastructure for that subscriber; and a high speed link between the first aggregator separator system and the second aggregator separator system that is separate from the POTS twisted wire pair infrastructure over which the outward radio frequency stream and the inward radio frequency stream are communicated, wherein each aggregator separator system further includes:

a plurality of first modules that each group a number of analog signals of the xDSL services to form a sub-channel of the corresponding radio frequency stream that is aggregated by the aggregator separator system;

an up-converter module to multiplex the plurality of sub-channels formed by the plurality of first modules into the corresponding radio frequency stream;

a down-converter module to de-multiplex the corresponding radio frequency stream that is separated by the aggregator separator system into a plurality of sub-channels; and a plurality of second modules that each derive a number of analog signals of the xDSL services from a corresponding one of the plurality of sub-channel de-multiplexed by the down-converter module.

2. The network system of claim 1 wherein the high speed link is programmable for variable numbers, bandwidths and formats of the xDSL services by selectively altering at least one of the number, bandwidth and format of the plurality of sub-channels.

3. The network system of claim 1 wherein the plurality of sub-channels includes at least one management channel that communicates at least one of provisioning information, status information, statistical information and management information that is utilized or generated by the aggregator separator systems.

4. The network system of claim 1 wherein the xDSL services comprise more than one of type of DSL service selected from the set consisting of DSL, HDSL, ADSL and VDSL services.

5. The network system of claim 1 wherein the xDSL services comprise more than one of type of coding format selected from the set consisting of CAP, DMT, QAM and 2B1Q coding formats.

6. The network system of claim 1 wherein the high speed link is selected from the set consisting of: coaxial cable, fiber and free air radio transmission.

7. A method for delivering bi-directional digital subscriber loop (xDSL) services to a plurality of subscribers connected to a Distribution Center by an existing Plain Old Telephone System (POTS) twisted wire pair infrastructure, the method comprising:

providing a first aggregator separator system at a location proximate the Distribution Center and operably coupled to a plurality of broadband service systems via the Distribution Center;

providing a second aggregator separator system at a location remote from the Distribution Center and remote from the plurality of subscribers and operably coupled to each of the plurality of subscribers by a twisted wire pair drop line in the existing POTS twisted wire pair infrastructure;

providing a high speed link between the first aggregator separator system and the second aggregator separator system that is separate from the POTS twisted wire pair infrastructure;

using the first aggregator separator system to:
aggregate xDSL services from the plurality of broadband services and destined for the plurality of subscribers as an outward radio frequency stream transmitted over the high speed link, and
separate xDSL services received from the plurality of subscribers as an inward radio frequency stream into separated xDSL services which are delivered to the plurality of broadband services;

using the second aggregator separator system to:
aggregate xDSL services from the plurality of subscribers and destined for the Distribution Center as the inward radio frequency stream transmitted over the high speed link, and
separate xDSL services received from the plurality of broadband services as the outward radio frequency stream into separated xDSL services, each of which is delivered to one of the plurality of subscribers by the corresponding twisted wire pair drop line in the existing POTS twisted wire pair infrastructure for that subscriber.

8. The method of claim 7 wherein the steps of using the first and second aggregator separator system further include:
  separately grouping a number of analog signals of the xDSL services to form one of a plurality of sub-channels of the corresponding radio frequency stream that is aggregated by the aggregator separator system;
  multiplexing the plurality of sub-channels front the separately grouping step into the corresponding radio frequency stream;
  de-multiplexing the corresponding radio frequency stream that is separated by the aggregator separator system into a plurality of sub-channels; and
  separately deriving a number of analog signals of the xDSL services from each of the plurality of sub-channel from the de-multiplexing step.

9. The method of claim 7 further comprising selectively altering at least one of the number, bandwidth and format of the plurality of sub-channels such that the high speed link is programmable for variable numbers, bandwidths and formats of the xDSL services.

10. The method of claim 8 wherein the plurality of sub-channels includes at least one management channel and wherein the method further comprises communicating at least one of provisioning information, status information statistical information and management information on the at least one management channel that is utilized or generated by the aggregator separator systems.

11. The method of claim 7 wherein the steps to aggregate and separate xDSL services utilize more than one of type of DSL service selected from the set consisting of DSL, HDSL, ADSL and VDSL services.

12. The method of claim 7 wherein steps to aggregate and separate the xDSL services utilize more than one of type of coding format selected from the set consisting of CAP, DMT, QAM and 2B1Q coding formats.

13. The method of claim 7 wherein the step of providing the high speed link is accomplished by providing a high speed link selected from the set consisting of: coaxial cable, fiber and free air radio transmission.

14. A method for transferring broadband multi-media signals using an existing Plain Old Telephone System (POTS) infrastructure, the method comprising:
  providing a distribution side aggregation separation device and at least one subscriber side aggregation separation device, the distribution side and the subscriber side aggregation separation devices configured to receive and transmit signals in at least one subchannel selected from a plurality of subchannels contained within a programmable bandwidth;
  configuring at least one subchannel from the plurality of subchannels with provisioning information;
  receiving a plurality of inputs signals at the distribution side aggregation separation device wherein the plurality of signals originate from one or more inputs, the input signals characterized by varying bandwidth and varying format;
  based upon the provisioning information, grouping a second plurality of the input signals selected from the plurality of input signals to form the at least one subchannel wherein the at least one subchannel is contained within the programmable bandwidth;
  multiplexing the plurality of subchannels into a radio frequency signal stream;
  transferring the radio frequency signal stream over a high-speed link from the distribution side aggregator separator system to the subscriber aide aggregrator separator system; and
  receiving and de-multiplexing the radio frequency signal stream at the subscriber side aggregator separator system to retrieve the plurality of subchannels.

* * * * *